May 30, 1939.  P. A. HURTADO  2,160,546
PEDAL-CAR SHIELD
Filed Sept. 2, 1938  2 Sheets-Sheet 1
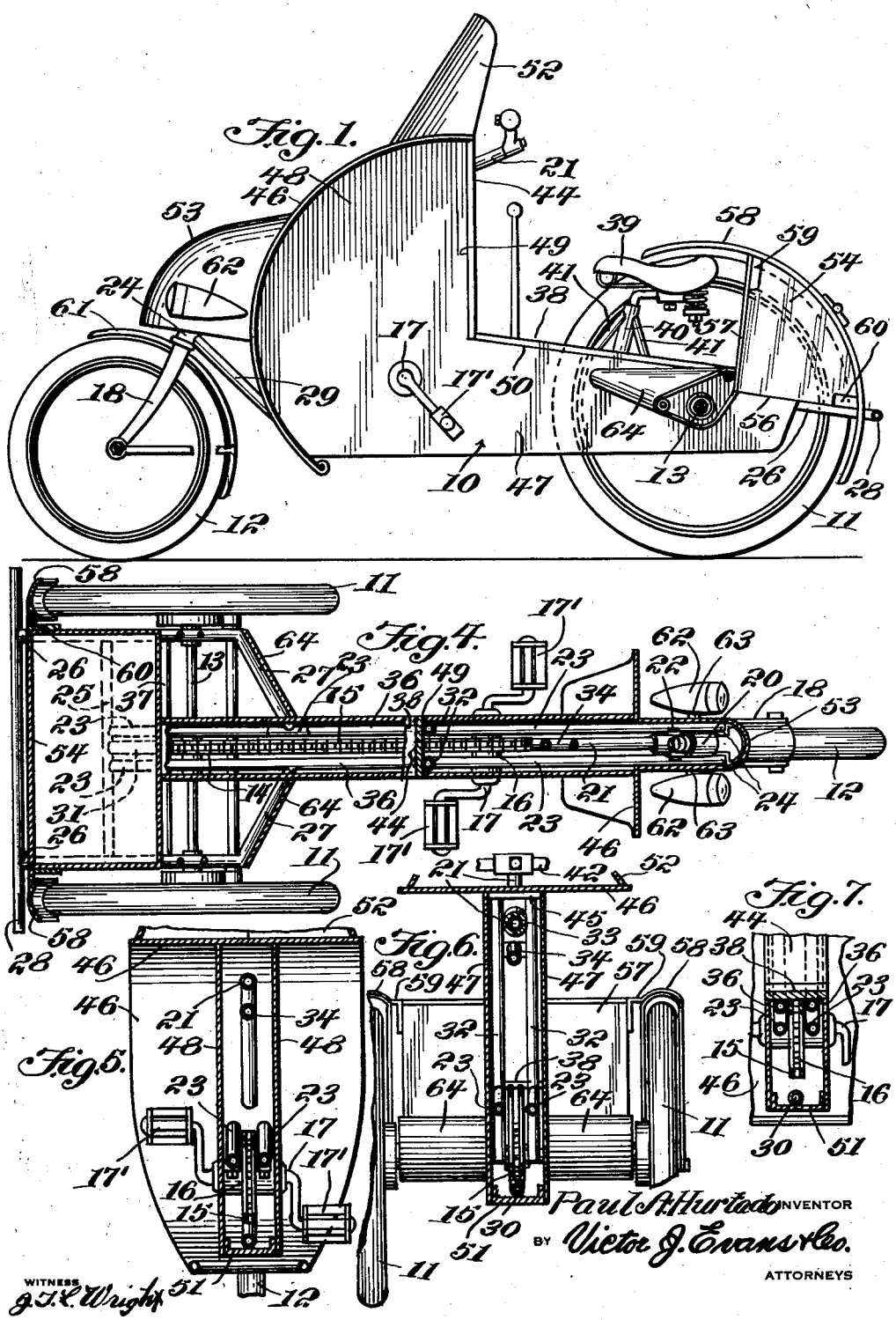

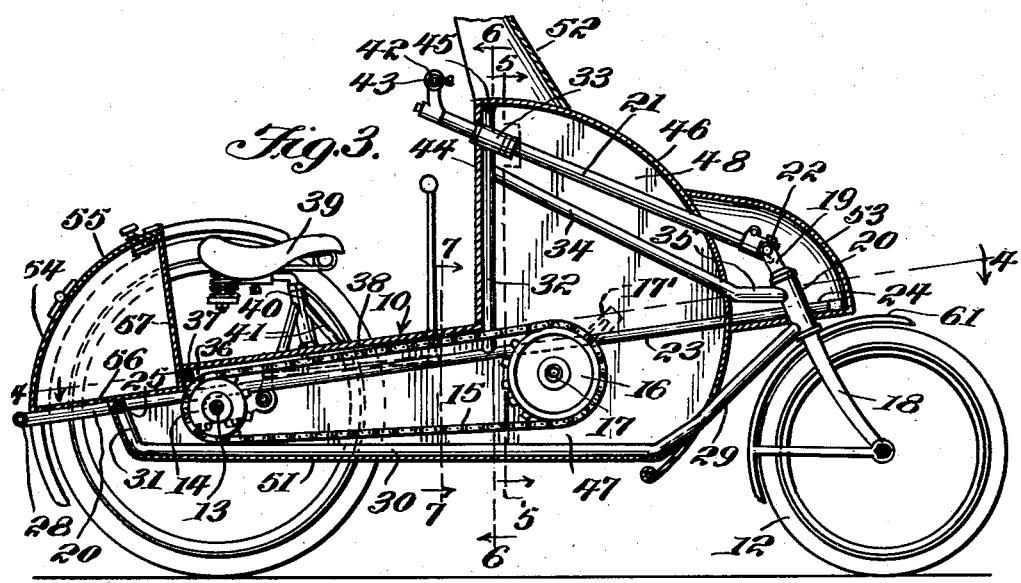

Patented May 30, 1939

2,160,546

UNITED STATES PATENT OFFICE 2,160,546

PEDAL-CAR SHIELD

Paul A. Hurtado, Toledo, Ohio

Application September 2, 1938, Serial No. 228,226

5 Claims. (Cl. 296—78.1)

This invention relates to pedal cars and more particularly to a body frame and shield structure for such vehicles.

The invention has for its principal object to produce a body frame structure which is simple, compact and light in weight, yet possessing ample strength and affording a low center of gravity for the vehicle.

A further object is to provide a special shield structure to cover the major portion of the body frame and operating parts of the driving means of the vehicle whereby to afford not only a practical protective casing for the frame and said operating parts but also to serve as an effective wind-shield protecting practically the entire body of the rider and overcoming wind resistance to the propulsion and speed of the vehicle.

With the foregoing and other objects to be attained, as will hereinafter more fully appear, the invention consists in the general structure and in the parts and combinations and arrangements of parts thereof as hereinafter described and set forth with particularity in the appended claims, reference being had to the accompanying drawings illustrating a practical adaptation of the invention, and in which:

Figure 1 is a side elevation of a pedal car of the tricycle type equipped in accordance with the invention;

Figure 2 is a top plan view;

Figure 3 is a longitudinal vertical section;

Figure 4 is a horizontal section taken on or about the line 4—4 of Figure 3;

Figure 5 is a section on the line 5—5 of Figure 3;

Figure 6 is a section on the line 6—6 of Figure 3;

Figure 7 is a fragmentary view in section on the line 7—7 of Figure 3; and

Figure 8 is a fragmentary view showing the forward upper portion of the shield in front elevation.

Referring now to the drawings the numeral 10 designates generally pedal car of the tricycle type, that is to say, the body frame is mounted in a pair of rear traction or driving ground wheels 11 and a single front steering ground wheel 12. As illustrated more or less conventionally, the two rear traction wheels 11 are mounted fixedly on a driving axle 13 which is journaled in an obvious manner upon the body frame of the vehicle and provided with a sprocket wheel 14 having a chain connection 15 with a driving sprocket wheel 16 provided on a pedal shaft 17 located on a forward portion of the body frame. The front ground wheel 12 is journaled in the forked portion 18 of a steering element having a shank portion 19 which is swiveled in the steering head 20 of the body frame, said shank portion 19 having a steering shaft 21 attached thereto by a universal coupling 22.

As shown, the body frame comprises an elongated central pair of tubular members 23, the forward end portions 24 of which straddle the steering head 20 and extend a short distance forwardly thereof, said end portions 24 being welded or otherwise rigidly attached to the steering head on opposite sides thereof. The rear end portions of said pair of longitudinal frame members 23 are welded to the middle portion of a cross member 25, said cross member being secured at at its opposite ends to lateral longitudinally extending frame members 26 whose inner end portions are bent inwardly, at an angle, as at 27, and secured at their extreme ends to the adjacent one of said longitudinal frame members 23, respectively. The outer ends of said lateral longitudinally extending frame members 26 are attached to a cross member 28, the opposite end portions of said member 28 extending across the peripheral portions of the traction wheels 11 with sufficient clearance therebetween so as not to interfere with the rotative movement of the wheels, said cross members 28 serving as a bumper for protecting the wheels and the rear body portion of the vehicle.

The body frame further includes a single longitudinal member whose forward end portion 29 is rigidly attached to the lower rear portion of the steering head 20 and etxends downwardly therefrom at an inclination and thence horizontally, as at 30, to some distance beneath and beyond the axle 13, the rear end portion 31 of said frame member being turned upwardly and rigidly attached to the middle portion of the cross member 25 of the body frame between the attached end portions of said pair of central frame members 23. Extending upwardly from the pair of longitudinal central frame members 23, approximately midway between the steering head 20 and the axle 13, is a pair of uprights 32 which are rigidly connected at their upper ends by a bearing member 33 interposed therebetween and for supporting the steering shaft 21. Said upright frame members 32 are braced by a diagonal stay member 34 whose upper end portion is secured between said upright members 32 just below the bearing member 33, the lower end portion 35 of said stay member being turned horizontally and attached to the rear upper portion of the steering head 20. This completes the body frame proper except for a relatively short pair of longitudinal frame members 36 which extend rearwardly from said upright members 32 parallel with and spaced slightly above said main pair of frame members 23, the rear end portions of said pair of members 36 being attached to a cross member 37 which is slightly arched and rigidly attached at its opposite ends to the respective frame members 26.

Secured on the upper pair of relatively short members 36 is a narrow central body plate 38, this plate being of a width slightly greater than the distance between the opposite sides of the frame members 36 and extending longitudinally from the upright frame members 32 to the cross member 37 so as to provide a restricted platform portion for the vehicle body and on which the rider's seat or saddle 39 is mounted. As shown, the support for the saddle 39 comprises a standard 40 extending upwardly from the plate 38 and suitably braced at front and rear by diagonal stays 41. It is here noted that the saddle 39 is located relatively close to both the vertical and horizontal planes of the driving axle 13 and that the pedal axle 17 is located a considerable distance forward of the saddle and at approximately the same horizontal plane as the driving axle 13, while the handle bar 42 on the inner end of the steering shaft 21 is located with its hand grasping portions 43 within convenient reach of the rider seated on the saddle 39 and astride the platform plate 38 with his feet on the pedals 17', in which position the propelling push on the pedals is forwardly in a more nearly horizontal plane rather than substantially vertically as in the propulsion of the ordinary bicycle.

Extending upwardly from the forward end of the platform plate 38, adjacent the upright frame members 32, is a narrow plate 44 of substantially the same width as the plate 38, said plate 44 being rigidly attached to said upright frame members 32.

Preferably, the upper end portion of the vertical plate 44 is provided with a forwardly extending lip or flange 45 which projects over the upper ends of the adjacent frame members 32 to receive and support the middle upper marginal portion of a curved shield plate 46 which extends forwardly to near the steering head 20 and thence downwardly and terminating with its lower end slightly below the horizontal portion 30 of the frame truss member. This plate 46 is of substantial width as compared to the plates 38 and 44, that is to say, it extends a considerable distance at opposite sides of said plates 38 and 44 a sufficient distance to afford a substantial windshield which will not only protect the rider but materially minimize wind resistance in the operation of the vehicle. Located on opposite sides of the body frame are side plates 47, the forward portions of which are enlarged, as at 48, and have their marginal portions curved correspondingly to the curvature of the plate 46, which marginal portions of the plates 47 are respectively secured to the curved shield plate 46 by a welding process or any other suitable means. The vertical marginal portions 49 of said plates 47 being secured to the adjacent marginal portions of the vertical body plate 44, while the upper marginal portions 50 of the rearwardly extending relatively narrow lower portions of said plates 47 are secured to the adjacent marginal portions of the platform plate 38.

The assembled plates 38, 44, 46 and 47, as just above described, provide a relatively narrow, vertically disposed body casing which effectively houses and protects frame members and operating parts within, and at the same time reinforces the frame structure without unduly increasing the weight thereof or appreciably increasing the width of that portion of the vehicle body which is straddled by the rider in propelling the vehicle.

The body casing just described is preferably closed by a bottom plate 51 which is preferably removably attached so that access may be readily gained to the interior of the casing. Preferably, a supplemental wind-shield 52 is provided at the top of the curved shield plate 46. This supplemental shield 52, as shown, inclines upwardly and rearwardly and is substantially V-shaped in cross section and extends substantially the full width of the curved shield plate 46 and it being of a height to effectively protect the rider in the region of the shoulders and possibly his face, in which event said supplemental shield may be made of transparent material either in part or as a whole.

As shown, a narrow hood extension 53 is provided over the steering head 20 and adjacent frame parts attached thereto as well as the universal coupling 22 of the steering means, said hood extension being rounded and otherwise formed to carry out the streamline effect of the entire shield structure as well as affording a supporting reinforcement for the central portion of the curved shield plate 46.

To carry out the body casing protective effect as well as to preserve the ornate appearance of the vehicle body and also for practical utilitarian purposes, a trunk or special compartment casing 54 is provided on the rear portion of the body frame, said compartment casing having a rounded side corresponding substantially to the peripheral curvature of the rear traction wheels 11 and being provided with a suitably hinged door 55. As shown, this compartment casing is provided with a flat bottom 56 which is attached to the adjacent body under frame members and a perpendicular inner wall 57 which abuts the outer end of the platform plate 38, thus completing the continuity of the body casing structure. As shown, the regular rear wheel fenders 58 are attached at their upper portions to the side walls of the compartment casing 54 by bracket members 59 and also at their lower rear portions to said casing 54 by angle brackets 60. In this connection, it is also noted that the front ground wheel 12 is provided with the regular mud guard or fender 61 which is attached to the steering fork 18 in the usual manner.

For further enhancing the ornamental appearance of the shield structure and in keeping with the streamline effect, as well as to locate and support headlights in a practical manner on the vehicle, a pair of headlight shells 62 of bullet shape are attached by bracket members 63, one on each side of said hood extension 53. So, too, lateral hollow shield extensions 64 are provided on opposite sides of the narrow central main body casing of the vehicle and covering the frame members 26 and 27, said shield portions 64 being attached at their inner longitudinal and rear margins respectively to the body casing side plates 47 and adjacent wall portion of the trunk casing 54.

What is claimed is:

1. A pedal car of the character described, comprising a relatively narrow wheeled frame supporting a relatively low rider's seat and having propelling pedal cranks mounted thereon forwardly of the seat with the axis thereof approximately in the horizontal plane of the axis of the traction ground wheels of the vehicle, a relatively narrow and vertically disposed main body shield casing covering the adjacent frame portion of the vehicle, the forward end portion of said casing being rounded outwardly from top to bottom, and a correspondingly curved shield plate attached to the rounded forward portion of the body shield, said curved shield plate extending within a range from top to bottom and with lateral projection on opposite sides of the body casing whereby to shield practically the entire body of the rider seated on the vehicle and straddling the body casing with his feet in engagement with the propelling pedal cranks of the vehicle.

2. In a pedal car of the tricycle type, said car comprising a relatively low longitudinal body frame supported at its rear end portion on a driving axle carried by a pair of traction ground wheels, the forward portion of said body frame being supported by a steering element mounted on a steering ground wheel, said body frame being of substantial width at its rear portion between said pair of traction ground wheels, but being relatively narrow throughout its entire length forwardly of said widened rear portion, the body frame having an upright extension intermediate the ends of its narrow longitudinal portion, a body casing comprising a relatively narrow longitudinal platform plate mounted on the upper side of said narrow portion of the body frame and extending between the widened rear portion of said frame and the intermediate upright extension of the frame, a correspondingly narrow upright plate covering the intermediate upright frame extension, side plates located on opposite sides of the body frame and coinciding marginally with said narrow platform and upright plates, the forward marginal portions of said side plates being rounded outwardly from top to bottom, and a correspondingly curved plate secured to said rounded marginal portions of the side plates, said plate extending with a vertical range and lateral projection on opposite sides of the body casing whereby to shield substantially the entire body of a rider seated on the platform plate of the casing and straddling the forward portion of the casing in pedaling the vehicle.

3. In a pedal car structure, a relatively low body frame widened at its rear portion and supported on a driving axle mounted on a pair of traction ground wheels, the major portion of said frame being elongated and relatively narrow and supported at its forward end on a steering element mounted on a ground steering wheel, a body casing inclosing the body frame, said casing being generally low at its rear portion and provided with a relatively narrow platform plate, a rider's seat mounted on said platform plate and in a plane slightly above the axis of the traction wheels, said casing further including a pair of side plates having relatively low rear portions coinciding marginally with said platform plate, the forward portions of said side plates being relatively high and the forward margins thereof being rounded outwardly from top to bottom, propelling pedal cranks located outside of said side plates of the body casing, the axis of said cranks being forward of the rider's seat and approximately in the horizontal plane of the axis of the traction wheels, the body casing further including a shield plate curved correspondingly to the marginal curvature of the forward portions of the side plates of the casing, said shield plate extending with a covering range from top to bottom and projected laterally on opposite sides of the body casing, a relatively narrow hood extension on said curved shield plate covering the steering element at the front of the vehicle, and a shield extension at the upper end of the said curved shield plate.

4. A shielded pedal car comprising a body casing inclosing the body frame of the vehicle, said casing being relatively narrow throughout the major longitudinal extent thereof, the rear portion of said casing being relatively low but the forward portion thereof being of substantial height, a relatively low driver's seat on the rear portion of said casing, propelling pedal cranks on opposite sides of the forward portion of the casing, the axis of said cranks being approximately in the horizontal plane of the axis of the ground wheels of the vehicle, and a shield plate at the front end of the body casing, said shield plate being bowed outwardly from top to bottom and projecting laterally on opposite sides of the casing whereby to shield substantially the entire body of the rider seated on the vehicle and straddling the portion of the casing forward of the seat with his feet in engagement with the propelling pedal cranks.

5. A shielded pedal car comprising a body casing inclosing the body frame of the vehicle, said casing being relatively narrow throughout the major longitudinal extent thereof, the rear portion of said casing being relatively low but the forward portion thereof being of substantial height, a relatively low driver's seat on the rear portion of said casing, propelling pedal cranks on opposite sides of the forward portion of the casing, the axis of said cranks being approximately in the horizontal plane of the axis of the ground wheels of the vehicle, a shield plate at the front end of the body casing, said shield plate being bowed outwardly from top to bottom and projecting laterally on opposite sides of the casing whereby to shield substantially the entire body of the rider seated on the vehicle and straddling the portion of the casing forward of the seat with his feet in engagement with the propelling pedal cranks, a shield extension at the upper end of said bowed shield plate, a narrow hood extension forward of the middle portion of said bowed shield plate, a trunk casing at the rear of said body casing, and lateral shield members attached to the rear portions of the body side plates and the adjacent wall portions of the wall casing.

PAUL A. HURTADO.